(12) United States Patent
Skelton

(10) Patent No.: US 11,614,629 B2
(45) Date of Patent: Mar. 28, 2023

(54) EXPANDABLE BAND SYSTEM FOR SPATIAL COMPUTING HEADSET OR OTHER WEARABLE DEVICE

(71) Applicant: MAGIC LEAP, INC., Plantation, FL (US)

(72) Inventor: Robert Coleman Skelton, Sunrise, FL (US)

(73) Assignee: Magic Leap, Inc., Plantation, FL (US)

( * ) Notice: Subject to any disclaimer, the term of this patent is extended or adjusted under 35 U.S.C. 154(b) by 175 days.

(21) Appl. No.: 17/119,145

(22) Filed: Dec. 11, 2020

(65) Prior Publication Data

US 2021/0181516 A1 Jun. 17, 2021

Related U.S. Application Data

(60) Provisional application No. 62/947,754, filed on Dec. 13, 2019.

(51) Int. Cl.
*G02B 27/01* (2006.01)

(52) U.S. Cl.
CPC .................. *G02B 27/0176* (2013.01)

(58) Field of Classification Search
CPC .... G02B 27/01; G02B 27/0176; G02B 27/02; G02B 27/0178; G02C 3/02; G02C 3/003; G02C 5/20; G02C 2200/26
See application file for complete search history.

(56) References Cited

U.S. PATENT DOCUMENTS

| 4,479,703 | A | 10/1984 | Enghofer | |
|---|---|---|---|---|
| 7,399,079 | B2 * | 7/2008 | Skuro | G02C 3/003 351/123 |
| 7,766,477 | B2 * | 8/2010 | Skuro | G02C 3/003 24/3.13 |
| 7,878,648 | B2 * | 2/2011 | Skuro | G02C 3/003 351/156 |
| 11,036,054 | B2 * | 6/2021 | Poore | G02C 3/003 |
| 2005/0067449 | A1 | 3/2005 | Jauvin et al. | |
| 2011/0090135 | A1 | 4/2011 | Tricoukes et al. | |
| 2018/0299681 | A1 | 10/2018 | Eastwood et al. | |
| 2019/0155036 | A1 * | 5/2019 | Toyama | G02B 27/0179 |

OTHER PUBLICATIONS

PCT International Search Report and Written Opinion for International Appln. No. PCT/US2020/064541, Applicant Magic Leap, Inc., dated Mar. 10, 2021 (11 pages).

* cited by examiner

*Primary Examiner* — Sardis F Azongha
(74) *Attorney, Agent, or Firm* — Vista IP Law Group, LLP

(57) ABSTRACT

Expandable band systems for wearable devices, such as spatial computing headsets, are provided which have flexible and conformable form factors that enable users to reliably to secure such wearable devices in place. Further, in the context of spatial computing headsets with an optics assembly supported by opposing temple arms, the expandable band systems provide protection against over-extension of the temple arms or extreme deflections that may otherwise arise from undesirable torsional loading of the temple arms.

16 Claims, 5 Drawing Sheets

EXPANDABLE BAND SYSTEM FOR SPATIAL COMPUTING HEADSET OR OTHER WEARABLE DEVICE

RELATED APPLICATION DATA

The present disclosure claims priority to U.S. Provisional Application No. 62/947,754, filed on Dec. 13, 2019, and entitled "EXPANDABLE BAND SYSTEM FOR SPATIAL COMPUTING HEADSET OR OTHER WEARABLE DEVICE." The contents of the aforementioned patent application are hereby expressly and fully incorporated by reference in their entirety, as though set forth in full.

TECHNICAL FIELD

This disclosure generally relates to systems for securing a spatial computing headset or other wearable device to a user.

BACKGROUND OF THE INVENTION

Spatial computing headsets, including virtual reality and augmented reality headsets, have proven invaluable for many applications, spanning the fields of scientific visualization, medicine and military training, engineering design and prototyping, tele-manipulation and tele-presence, and personal entertainment systems. In spatial computing headsets, virtual or augmented scenes are displayed to a user via an optics assembly that is positionable and securable to a user's head in front of the user's eyes. Many different systems and techniques exist for securing such optics assemblies to a user's head, including various headband structures with mechanisms for fit adjustment. However, such systems and techniques may suffer from various drawbacks. For example, known fit adjustment mechanisms may be overly complex, bulky, lack precision and/or include a limited range of motion.

SUMMARY OF THE INVENTION

Embodiments described herein provide expandable band systems for wearable devices, such as spatial computing headsets, which have flexible and conformable form factors that enable users to reliably secure such wearable devices in place. Further, in the context of spatial computing headsets with an optics assembly supported by opposing temple arms, the expandable band systems provide protection against over-extension of the temple arms or extreme deflections that may otherwise arise from undesirable torsional loading of the temple arms (e.g., twisting one temple arm up and one temple arm down).

According to one embodiment, an expandable band system to assist in securing a wearable device to a user may be summarized as including a pair of sheath assemblies; and an inner band assembly movably coupled to and spanning between the sheath assemblies, the inner band assembly including a pair of biasing mechanisms coupled to the sheath assemblies for biasing the sheath assemblies toward each other. The expandable band system may be movable between a retracted configuration, in which the sheath assemblies are apposed (e.g., relatively closer together), and an expanded configuration, in which the sheath assemblies are separated (e.g., relatively further apart).

Each biasing mechanism may include a fixed end and a floating end opposite the fixed end, with the fixed end being secured to a respective one of the sheath assemblies. Each biasing mechanism may include an elongated compression spring and a flexible filament extending through the elongated compression spring, with the flexible filament including a spring stop at the floating end of the biasing mechanism. The inner band assembly may further include a band-like enclosure that surrounds the elongated compression springs of the biasing mechanisms.

The band-like enclosure may be slidably received in the sheath assemblies to slidably extend from the sheath assemblies as the system moves from the retracted configuration to the expanded configuration. The band-like enclosure may include a respective compression spring passageway for each elongated compression spring to assist in preventing the elongated compression springs from buckling as the system moves from the retracted configuration to the expanded configuration. A central portion of the band-like enclosure may be exposed as the system moves from the retracted configuration to the expanded configuration. The band-like enclosure may be configured to withdraw from the sheath assemblies and simultaneously compress each of the elongated compression springs as the system moves from the retracted configuration to the expanded configuration.

A braking device may be provided between at least one of the sheath assemblies and the band-like enclosure of the inner band assembly to resist movement of the band-like enclosure relative to the sheath assemblies. Similarly, a lock device may be provided between at least one of the sheath assemblies and the band-like enclosure of the inner band assembly to prevent movement of the band-like enclosure relative to the sheath assemblies.

Each sheath assembly may comprise a flexible band-like form factor. Each sheath assembly may include a plurality of cage elements that collectively define a cage structure that at least partially surrounds a respective end of the band-like enclosure of the inner band assembly when the system is in the retracted configuration. The plurality of cage elements may be spaced apart along a length of the sheath assembly to enable the sheath assembly to flex and assume a different curvature profile. Each sheath assembly may include an internal guiding structure, and the internal guiding structure and the plurality of cage elements may collectively define a band receiving passageway for accommodating the band-like enclosure of the inner band assembly. Each sheath assembly may include an inner pad for engaging the user's body and an outer cover. The inner pad and the outer cover may collectively define an enclosure for housing the internal guiding structure and the plurality of cage elements.

The sheath assemblies and the inner band assembly may collectively define a flexible and extendable band-like structure that is conformable to a profile of the user's body. The expandable band system may be incorporated in a spatial computing headset or other wearable device, such as, for example, a smartwatch. For example, a spatial computing headset, according to one example embodiment, may be summarized as including: an optics assembly; a pair of temple arms movably coupled to the optics assembly; and an expandable band system to assist in securing the spatial computing headset to a head of a user, the expandable band system spanning between aft ends of the temple arms. The expandable band system may include a pair of sheath assemblies; and an inner band assembly movably coupled to and spanning between the sheath assemblies, the inner band assembly including a pair of biasing mechanisms coupled to the sheath assemblies for biasing the sheath assemblies together. The expandable band system may be movable between a retracted configuration, in which the sheath assemblies are apposed (e.g., relatively closer together), and an expanded configuration, in which the sheath assemblies are separated (e.g., relatively further apart).

The expandable band system may be configured to assist in biasing the temple arms toward each other. The expandable band system may be flexible and biased toward the retracted configuration to conform to the head of the user to provide a generally uniform retention force. The expandable band system may be configured to resist over-extension and extreme deflection of the temple arms.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with spatial computing headsets and fit adjustment systems for securing the same to a user have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
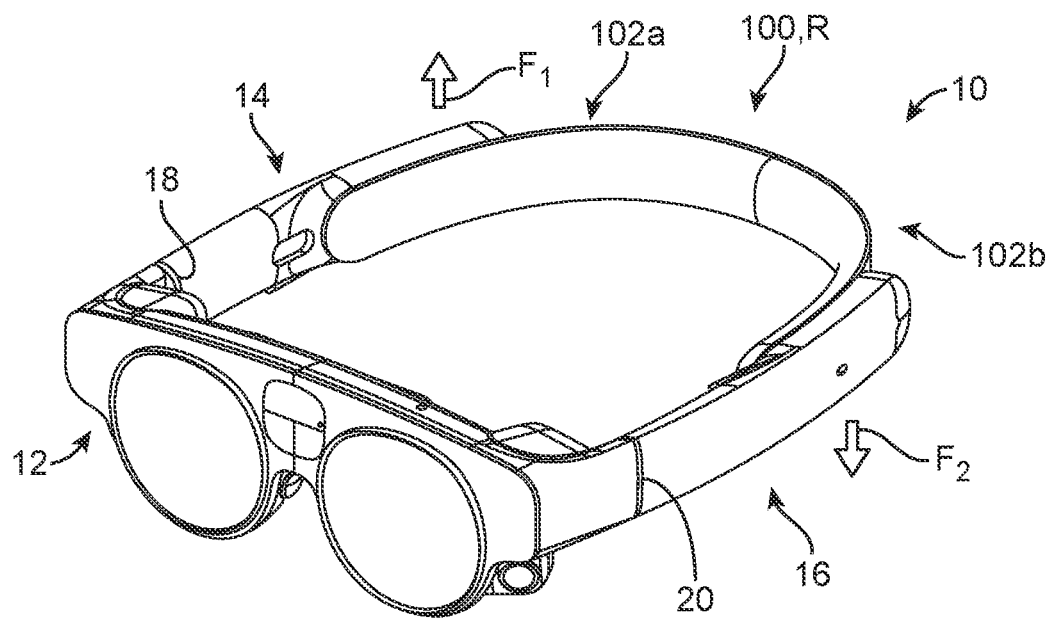
FIG. 1 is an isometric view of a spatial computing headset including an expandable band system according to one example embodiment with the expandable band system in a retracted configuration.
Figure 2:
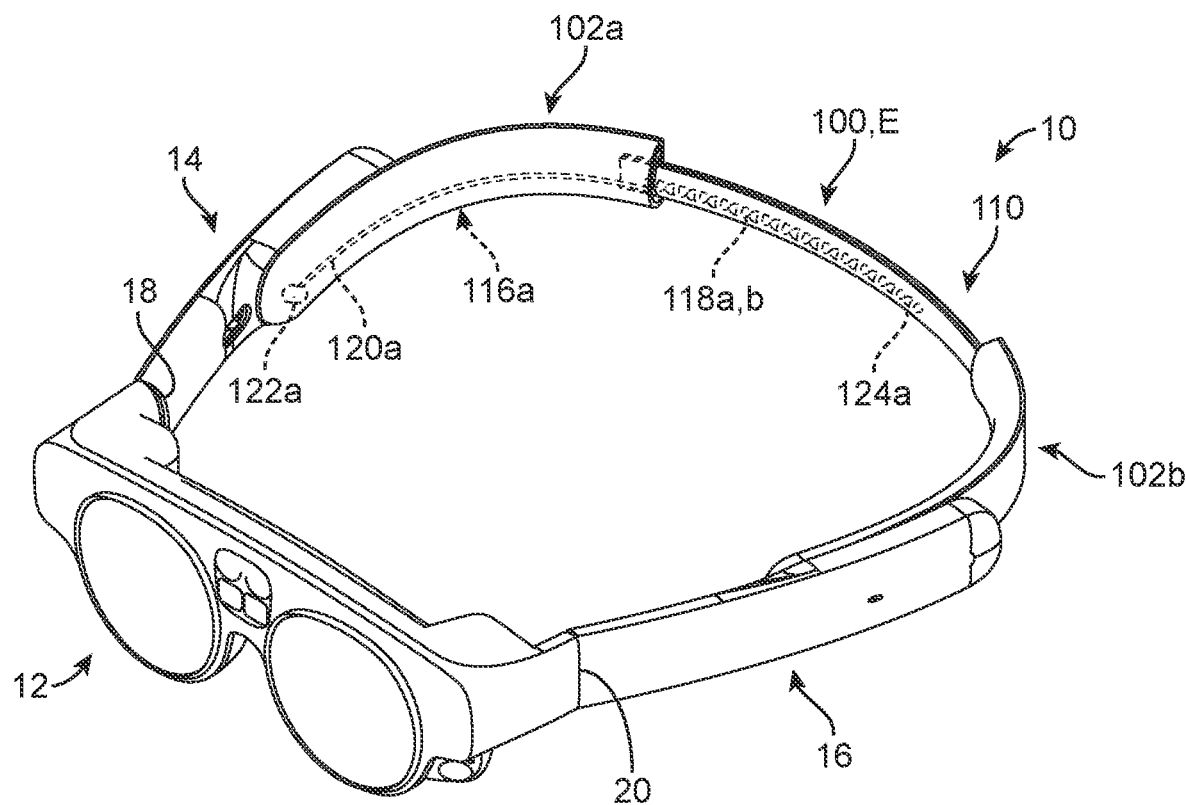
FIG. 2 is an isometric view of the spatial computing headset of FIG. 1 with the expandable band system in an expanded configuration.

FIGS. 1 through 7 show one example embodiment of an expandable band system 100 to assist in securing a wearable device to a user. In particular, and with reference to FIGS. 1 and 2, the expandable band system 100 is provided for securing a spatial computing headset 10 to a user's head. The spatial computing headset 10 includes an optics assembly 12 supported by a pair of temple arms 14, 16. Well-known structures and devices associated with spatial computing headsets (e.g., optical components and internal electronic circuitry) are not shown or described in detail to avoid unnecessarily obscuring descriptions of the embodiments disclosed herein. The example wearable device shown in FIGS. 1 and 2 is non-limiting, and embodiments may be employed in other suitable (e.g., wearable) device arrangements.

Notably, the temple arms 14, 16 of the example headset 10 are movably coupled to the optics assembly 12 at joints 18, 20. Such joints 18, 20 may include a hinge mechanism or other movable joint (not visible) that enables the temple arms 14, 16 to move relative to the optics assembly 12 in one or more directions and within a limited range of motion. For instance, the example headset 10 includes hinges at joints 18, 20 with associated stops that enable the temple arms 14 to spread outwardly (i.e., away from a sagittal plane of the user) about twenty degrees from the retracted configuration R shown in FIG. 1 to the expanded configuration E shown in FIG. 2. The hinges may include one or more biasing members (e.g., torsional springs) that urge the temple arms 14, 16 back toward the retracted configuration R shown in FIG. 1 which may act in coordination with the expandable band systems described herein. In other instances, the hinges may lack such biasing members.

With continued reference to FIGS. 1 and 2, the expandable band system 100 of the illustrated embodiment is coupled to and spans between aft ends of the temple arms 14, 16. The expandable band system 100 includes a pair of sheath assemblies 102a, 102b and an inner band assembly 110 (visible in FIG. 2) that is movably coupled to and spans between the sheath assemblies 102a, 102b. As will be described in more detail elsewhere herein, the inner band assembly 110 includes a pair of biasing mechanisms 116a, 116b (FIG. 6) that are coupled to the sheath assemblies 102a, 102b for moving (i.e., biasing) the sheath assemblies 102a, 102b towards the retracted configuration R shown in FIG. 1. The expandable band system 100 is movable between the retracted configuration R, in which the sheath assemblies 102a, 102b are apposed (e.g., relatively closer together), and the expanded configuration E shown in FIG. 2, in which the sheath assemblies 102a, 102b are separated (e.g., relatively further apart).

Conveniently, in operation, a user may spread the temple arms 14, 16 of the spatial computing headset 10 to the configuration shown in FIG. 2, whereby the movement of the temple arms 14, 16 causes the sheath assemblies 102a, 102b to separate and the inner band assembly 110 to withdraw from the sheath assemblies 102a, 102b against the force of the biasing mechanisms 116a, 116b. The user can then position the headset 10 for use with the optics assembly 12 located in front of the user's eyes and with the temple arms 14, 16 extending past the user's temples, and then allow the temple arms 14, 16 to retract toward the retracted configuration R shown in FIG. 1 until the sheath assemblies 102a, 102b (and/or the temple arms 14, 16) contact the user's head and apply a retention force thereto to assist in securing the headset 10 in place. In this manner, the expandable band system 100 is configured to at least partially assist in moving/biasing the temple arms 14, 16 toward each other. In some instances, the expandable band system 100 may provide the sole means of moving/biasing the temple arms 14, 16 toward each.

Further, according to the example embodiment, the expandable band system 100 is flexible and conformable to a user's head to provide a generally uniform retention force, which enhances product stability, fit and/or comfort. Advantageously, the expandable band system 100 is also configured to resist over-extension and extreme deflection of the temple arms 14, 16 by providing substantial resistance and/or hard stops to undesirable movement of the temple arms 14, 16. For example, the expandable band system 100 may reduce and/or counteract torsional loads that may otherwise be transferred to the optics assembly 12 via the joints 18, 20 when twisting one temple arm 14 up and one temple arm 16 down, as represented by the arrows labeled F1 and F2 in FIG. 1. This can be advantageous in that the expandable band system 100 can therefore assist in preventing damage to vulnerable components of the optics assembly 12 that might otherwise result from such torsional loading.

Figure 3:
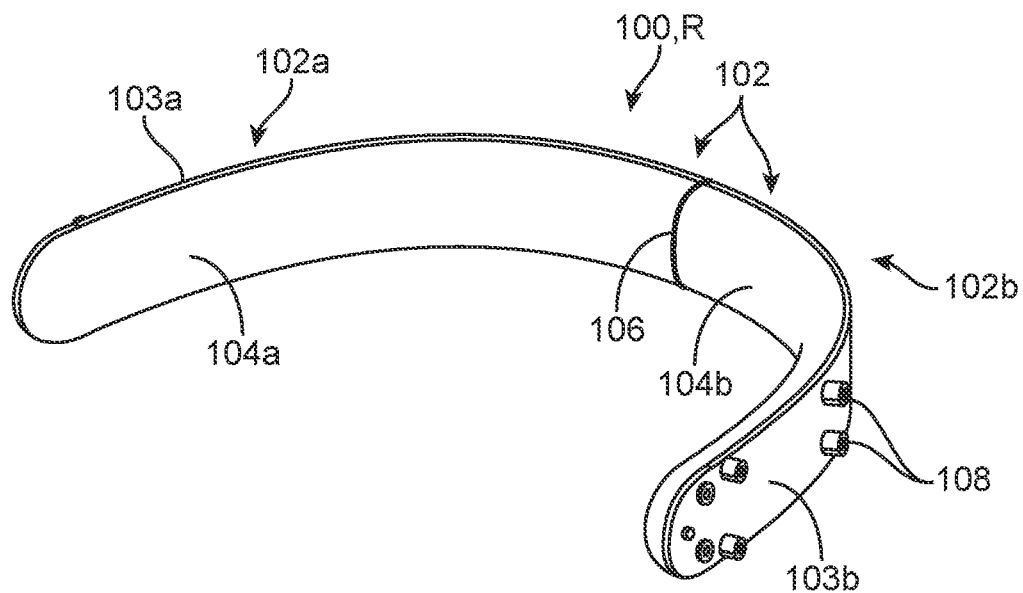
FIG. 3 is an isometric view of the expandable band system in the retracted configuration shown isolated from the remainder of the spatial computing headset of FIGS. 1 and 2.
Figure 4:
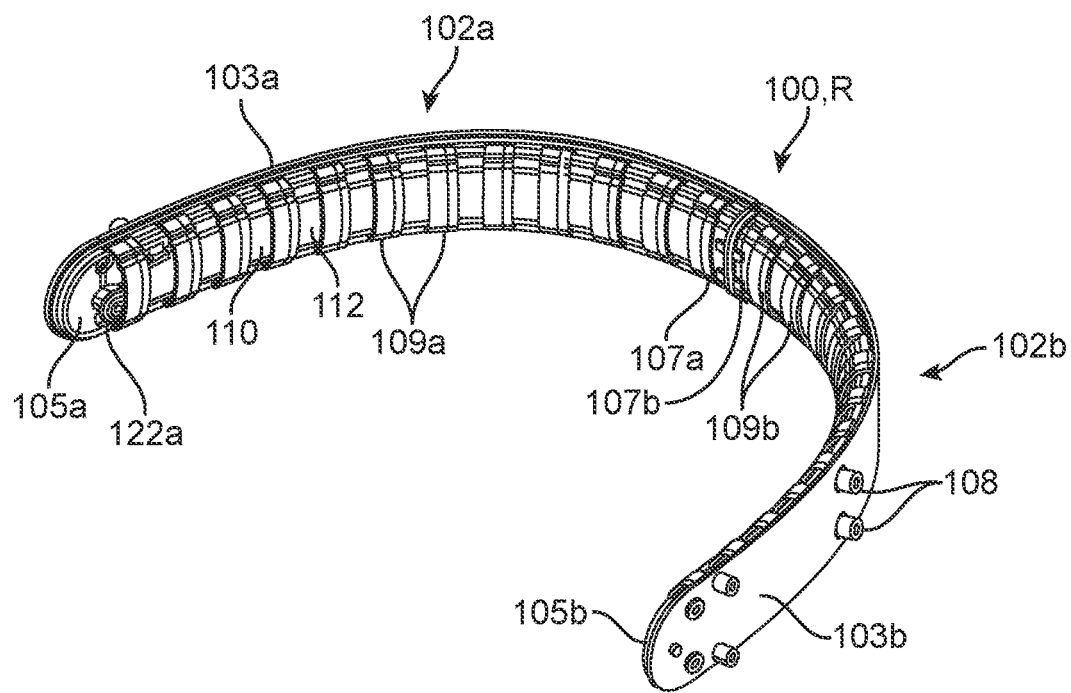
FIG. 4 is an isometric view of the expandable band system with inner pads of the expandable band system removed to reveal underlying components.
Figure 5:
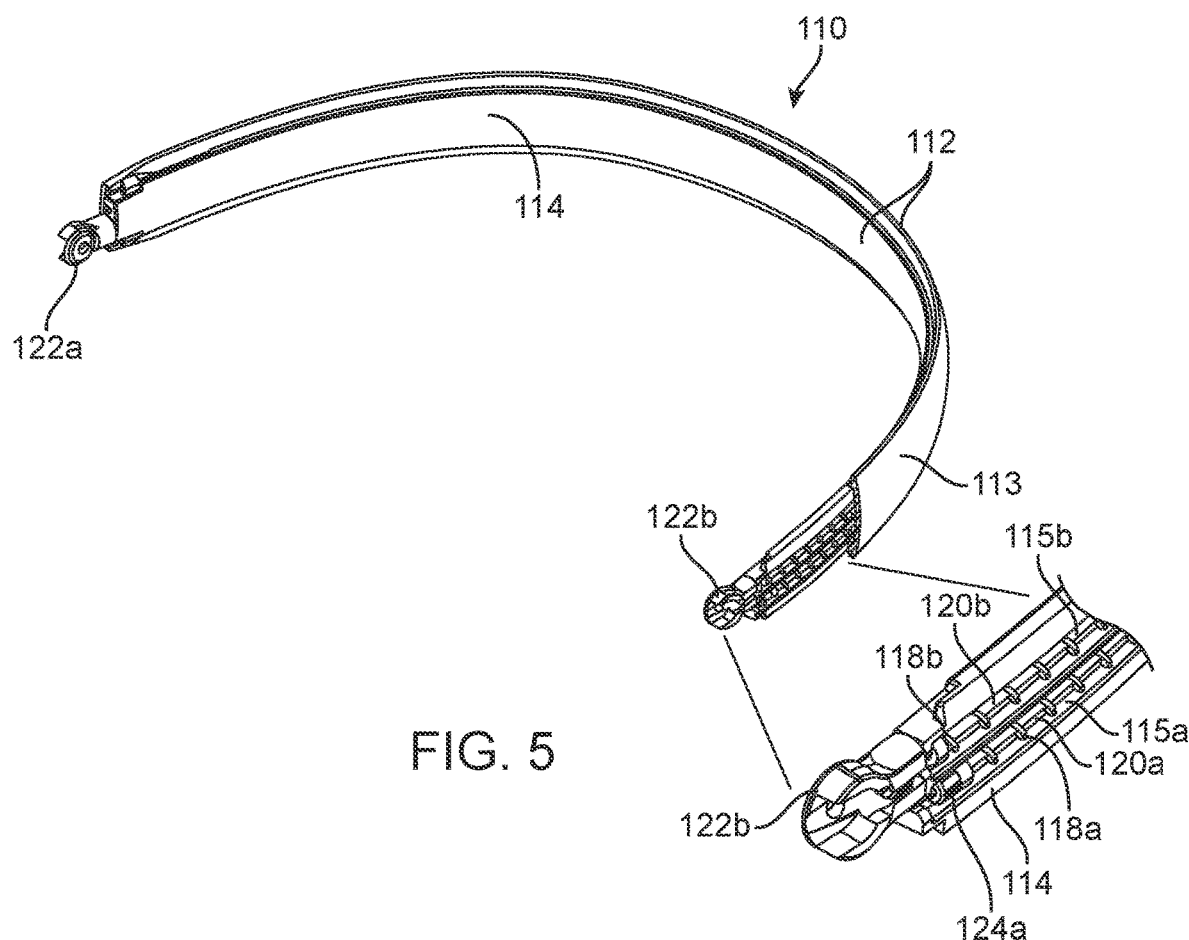
FIG. 5 is an isometric view of an inner band assembly of the expandable band system shown isolated from the remainder of the system, and with a portion of a band-like enclosure thereof cut away to reveal underlying components.
Figure 6:
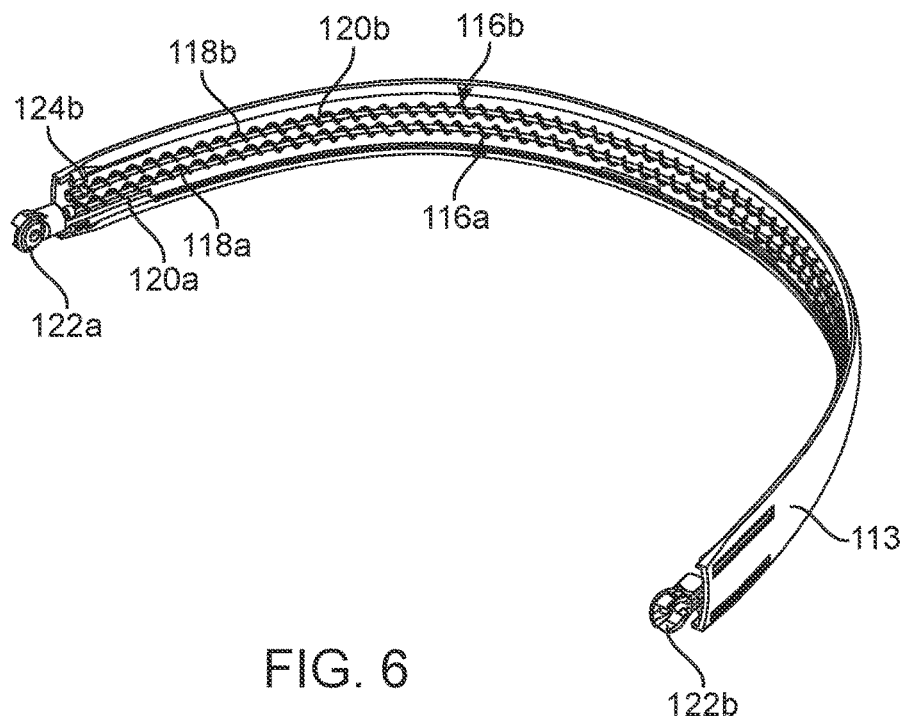
FIG. 6 is an isometric view of the inner band assembly of the expandable band system with an inner portion of band-like enclosure removed to reveal underlying components.

Further details of the expandable band system 100 will now be described with reference to FIGS. 3 through 7, wherein: FIG. 3 shows the expandable band system 100 in the retracted configuration and isolated from the remainder of the spatial computing headset 10; FIG. 4 shows the expandable band system 100 with inner pads 104a, 104b of the sheath assemblies 102a, 102b of the expandable band system 100 removed to reveal underlying components, including the inner band assembly 110; FIG. 5 shows the inner band assembly 110 isolated from the remainder of the expandable band system 100, and with an outer portion 113 of a band-like enclosure 112 of the inner band assembly cut back to reveal underlying components; FIG. 6 shows the inner band assembly 110 with an inner portion 114 of band-like enclosure 112 removed to reveal underlying components; and FIG. 7 shows internal guiding structures 105a, 105b of the expandable band system 100 that assist in guiding the inner band assembly 110 as the system 100 moves between the retracted configuration R and the expanded configuration E.

With reference to FIG. 3, the illustrated embodiment of the expandable band system 100 includes opposing sheath assemblies 102a, 102b (collectively 102), which in the retracted configuration R of the expandable band system 100, abut each other at seam location 106 to form a generally continuous band or band-like form factor with the inner band assembly 110 concealed therein. Each sheath assembly 102a, 102b includes an inner pad 104a, 104b for engaging the user's head (or other body part) and an outer cover 103a, 103b. Outer cover 103a, 103b and inner pad 104a, 104b collectively define an enclosure for internal components of the sheath assemblies 102a, 102b. The sheath assemblies 102a, 102b further include a mounting arrangement 108 (e.g., threaded inserts) for securing the expandable band system 100 to the temple arms 14, 16 of the spatial computing headset 10 of FIGS. 1 and 2 (or to other wearable devices).

With reference to FIG. 4, a plurality of cage elements 109a, 109b are provided beneath the inner pads 104a, 104b of each sheath assembly. The cage elements 109a, 109b collectively define a cage structure that at least partially surrounds a respective end of the band-like enclosure 112 of the inner band assembly 110 when the system 100 is in the retracted configuration R, and which assists in guiding the band-like enclosure 112 as it moves between the retracted configuration R and the expanded configuration E. Notably, for each sheath assembly 102a, 102b, the plurality of cage elements 109a, 109b are spaced apart along a length of the sheath assembly 102a, 102b to enable the sheath assembly 102a, 102b to flex and assume a different curvature profile, while at the same time providing structural integrity to the expandable band system 100.

Figure 7:
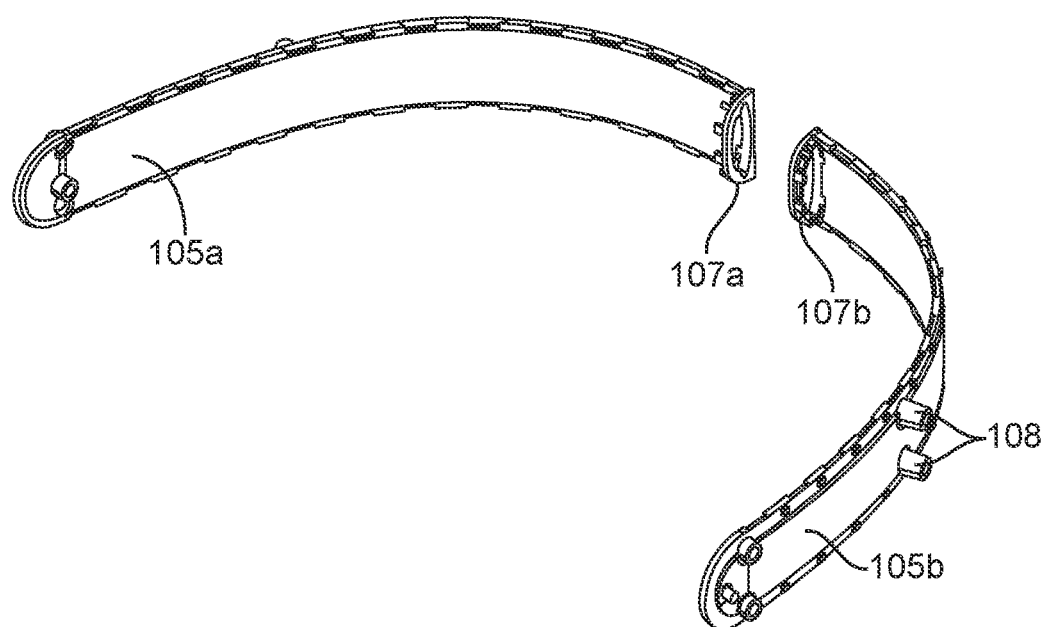
FIG. 7 is an isometric view of internal guiding structures of the expandable band system that assist in guiding the inner band assembly as the system moves between the retracted configuration and the expanded configuration.

Each sheath assembly 102a, 102b of the example embodiment further includes an internal guiding structure 105a, 105b, which is shown in greater detail in FIG. 7. The internal guiding structure 105a, 105b and the plurality of cage elements 109a, 109b of each sheath assembly 102a, 102b collectively define a respective band receiving passageway for accommodating one of the opposing ends of the band-like enclosure 112 of the inner band assembly 110. The internal guiding structure 105a, 105b and the plurality of cage elements 109a, 109b may be rigid components that exhibit little to no deformation during operation. The internal guiding structure 105a, 105b and the plurality of cage elements 109a, 109b of each sheath assembly 102a, 102b may be said to provide the sheath assembly 102a, 102b with a rigid skeletal structure.

Each sheath assembly 102a, 102b of the example embodiment further includes an end cap 107a, 107b, which includes an aperture through which a respective end of the band-like enclosure 112 passes. The end caps 107a, 107b may abut each other when the expandable band system 100 is in the retracted configuration R, and may provide a stop for establishing said retracted configuration R.

With reference to FIGS. 5 and 6, the inner band assembly 110 includes the aforementioned pair of biasing mechanisms 116a, 116b and the band-like enclosure 112. Each biasing mechanism 116a, 116b includes a fixed end 122a, 122b and a floating end 124a, 124b opposite the fixed end 122a, 122b. Each fixed end 122a, 122b protrudes from a respective end of the band-like enclosure 112 and is fixedly secured to a respective one of the sheath assemblies 102a, 102b, as shown in FIG. 4. For this purpose, each fixed end 122a, 122b may be provided with a fastening element for securing the fixed ends 122a, 122b of the biasing mechanisms 116a, 116b to the sheath assemblies 102a, 102b. For example, the fixed end 122a, 122b of the example embodiment includes a fastening anchor with an internal cavity sized to engage a corresponding protrusion of the internal guiding structure 105a, 105b of the sheath assembly 102a, 102b to which it is fixed. The fastening anchor further includes an aperture to receive a threaded fastener to retain the fastening anchor in place. In contrast, the floating end 124a, 124b of each biasing mechanism 116a, 116b is contained within the band-like enclosure 112 and is free to move relative to the band-like enclosure 112 as the system 100 transitions between the retracted configuration R and the expanded configuration E.

With continued reference to FIGS. 5 and 6, each biasing mechanism 116a, 116b further includes an elongated compression spring 118a, 118b (e.g., a metal compression spring) and a flexible filament 120a, 102b (e.g., a metal cable) extending through the elongated compression spring 118a, 118b. Each flexible filament 120a, 102b includes a spring stop at the floating end 124a, 124b, which abuts or is otherwise adjacent to one end of the corresponding compression spring 118a, 118b, as shown in the enlarged detail view of FIG. 5. The other end of each compression spring 118a, 118b is provided with or abuts a corresponding collar that is displaceable along a length of the flexible filament 120a, 102b as the band-like enclosure 112 is withdrawn from the sheath assemblies 102a, 102b as the system 100 transitions between the retracted configuration R and the expanded configuration E. More particularly, as the sheath assemblies 102a, 102b move toward the expanded configuration E, the band-like enclosure 112 is withdrawn from the sheath assemblies 102a, 102b and simultaneously compresses each of the compression springs 118a, 118b by pulling the collar toward the floating end 124a, 124b. Conversely, as the sheath assemblies 102a, 102b are allowed to move back toward the retracted configuration R, the band-like enclosure 112 retreats back into the sheath assemblies 102a, 102b and relieves the compression of the springs 118a, 118b. As shown in FIGS. 5 and 6, the biasing mechanisms 116a, 116b may be provided in a parallel relationship and the orientation of each biasing mechanism 116a, 116b may be the opposite of each other. In addition, each biasing mechanism 116a, 116b may extend at least a majority of a length of the expandable band system 100 or nearly an entire length of the expandable band system 100 (e.g., greater than 80%, 90% or 95% of the entire length).

With continued reference to FIGS. 5 and 6, the band-like enclosure 112 includes a respective compression spring passageway 115a, 115b for each elongated compression spring 118a, 118b to assist in preventing the elongated compression springs 118a, 118b from buckling as the system 100 moves from the retracted configuration R to the expanded configuration E. The compression spring passageways 115a, 115b may be formed, for example, in an inner portion 114 of the enclosure 112, as shown in the enlarged detail view of FIG. 5, and capped by an outer portion 113 of the enclosure 112. Conversely, the compression spring passageways 115a, 115b may be formed in the outer portion 113 of the enclosure 112 and capped by the inner portion 114 of the enclosure 112. In either event, it may be said that the compression spring passageways 115a, 115b are formed collectively by opposing portions of the enclosure 112. Still further, in other instances, the band-like enclosure 112 of the inner band assembly 110 may be formed integrally as a one-piece structure with compression spring passageways 115a, 115b provided therein. The band-like enclosure 112 may be semi-rigid to provide a flexible component that also provides some structural rigidity to resist buckling of the compression springs 118a, 118b during operation. The band-like enclosure 112 may comprise, for example, a flexible silicone material.

According to the illustrated embodiment, the inner band assembly 110 is slidably received in the sheath assemblies 102a, 102b to slidably extend from the sheath assemblies 102a, 102b as the expandable band system 100 moves from the retracted configuration R to the expanded configuration E. The biasing mechanisms 116a, 116b contained in the inner band assembly 110 are fixedly coupled at one end to the sheath assemblies 102a, 102b and arranged to urge the sheath assemblies 102a, 102b together towards the retracted configuration R. Again, as the sheath assemblies 102a, 102b move toward the expanded configuration E, such as by a user spreading the temple arms 14, 16 of the headset 10, the band-like enclosure 112 of the inner band assembly 110 is withdrawn from the sheath assemblies 102a, 102b and simultaneously compresses each of the elongated compression springs 118a, 118b. The stored energy in the compression springs 118a, 118b then acts to move the sheath assemblies 102a, 102b back together towards the retracted configuration R when the temple arms 14, 16 are released by the user. The expandable band system 100 then conforms to a profile of the user's head and secures the headset 10 in place to maintain proper registration/alignment of the wearable device.

Figure 8:
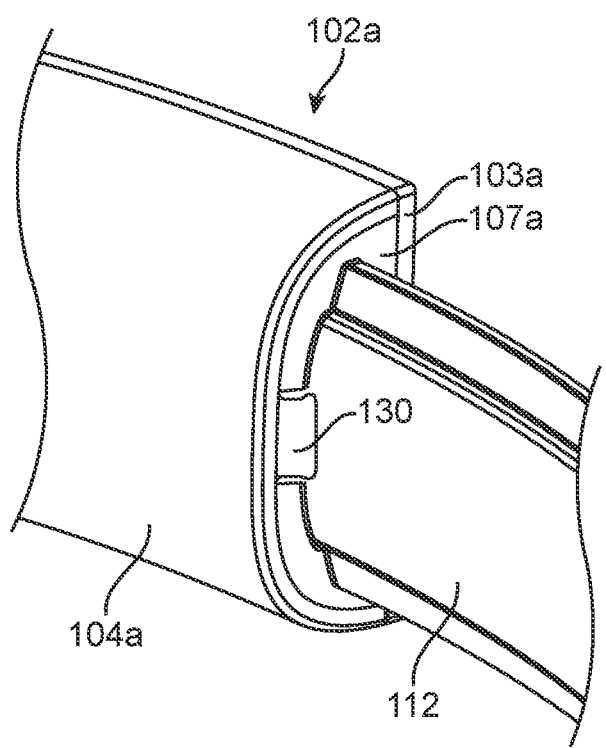
FIG. 8 is an isometric view of a portion of an expandable band system showing a variant having a braking device.

With reference now to FIG. 8, the expandable band system 100 may in some instances further include a braking device between at least one of the sheath assemblies 102a, 102b and the band-like enclosure 112 of the inner band assembly 110 to resist movement of the band-like enclosure 112 relative to the sheath assemblies 102a, 102b. For example, the braking device may include an engagement member 130, in this case a portion of the inner pad 104a, that is positioned nearly in contact with the band-like enclosure 112 and then urged into contact with band-like enclosure 112 as the user-facing pad 104a is compressed via engagement with the user. In this manner, when the expandable band system 100 is placed on the head and the user's head compresses the inner pad 104a, the engagement member 130 of the pad 104a, which serves as the braking device, then contacts the moving band-like enclosure 112, providing a braking force which would increase if the user pressed the expandable band system 100 in manually to provide a more snug fit. This would allow the user to implement a higher retention force than what can be provided by the compression springs 118a, 118b alone. When the user removes the expandable band system 100, the braking force would be removed and allow the expandable band system 100 to return naturally to the initial, non-braked state, namely, the retracted configuration R shown in FIG. 1.

Figure 9:
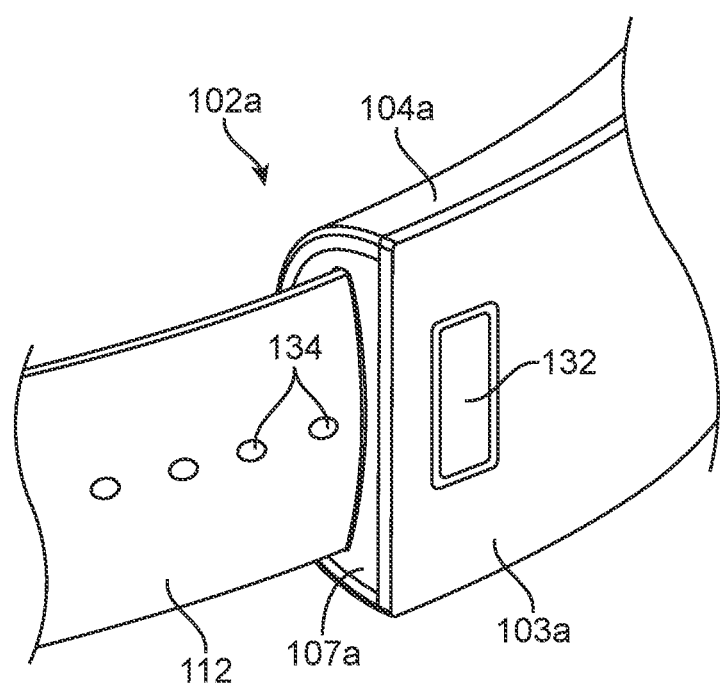
FIG. 9 is an isometric view of a portion of an expandable band system showing a variant having a lock device.

With reference now to FIG. 9, the expandable band system 100 may in some instances further include a lock device between at least one of the sheath assemblies 102a, 102b and the band-like enclosure 112 of the inner band assembly 110 to prevent movement of the band-like enclosure 112 relative to the sheath assemblies 102a, 102b. For example, the lock device may include a push-button lock 132 on a backside of the sheath assembly 102a which may be selectively actuated by the user to engage one of a plurality of detents 134 in the band-like enclosure 112 to lock the position of the expandable band system 100 in a desired intermediate configuration. In this manner, a user may adjust the fit of the expandable band system 100 and then lock the expandable band system 100 in a desired configuration.

Although embodiments disclosed herein are predominately described in the context of a spatial computing headset 10 with an associated expandable band system 100, it is appreciated that features and aspects of the expandable band systems 100 may be incorporated in other wearable devices, such as, for example, smartwatches. However, it is also appreciated that embodiments of the expandable band systems 100 disclosed herein are particularly well adapted for use with headwear including temple arms to limit undesirable displacement or deformation of such temple arms.

Moreover, it is appreciated that features and aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A spatial computing headset, comprising:
an optics assembly;

a pair of temple arms movably coupled to the optics assembly; and an expandable band system to assist in securing the spatial computing headset to a head of a user, the expandable band system spanning between aft ends of the temple arms and comprising:

a pair of sheath assemblies; and an inner band assembly movably coupled to and spanning between the pair of sheath assemblies, the inner band assembly including a pair of biasing mechanisms coupled to the pair of sheath assemblies and configured to move the pair of sheath assemblies together towards a retracted configuration, and wherein the expandable band system is movable between the retracted configuration, in which the pair of sheath assemblies are apposed, and an expanded configuration, in which the pair of sheath assemblies are separated, wherein each biasing mechanism includes a fixed end and a floating end disposed opposite the fixed end, and wherein the fixed end is fixedly secured to one of the pair of sheath assemblies, wherein each biasing mechanism includes an elongated compression spring and a flexible filament extending through the elongated compression spring, the flexible filament including a spring stop disposed at the floating end of the biasing mechanism, and wherein the inner band assembly further includes a band-like enclosure that surrounds the elongated compression springs of the biasing mechanisms.

2. The spatial computing headset of claim 1, wherein the expandable band system is configured to assist in biasing the temple arms toward each other.

3. The spatial computing headset of claim 1, wherein the expandable band system is flexible and biased toward the retracted configuration to conform to the head of the user and provide a uniform retention force.

4. The spatial computing headset of claim 1, wherein the expandable band system is configured to resist over-extension and severe deflection of the temple arms.

5. The spatial computing headset of claim 1, wherein the band-like enclosure is slidably received in the sheath assemblies and configured to slidably extend from the sheath assemblies as the system moves from the retracted configuration to the expanded configuration.

6. The spatial computing headset of claim 1, wherein the band-like enclosure includes a respective compression spring passageway for each elongated compression spring to assist in preventing the elongated compression springs from buckling as the system moves from the retracted configuration to the expanded configuration.

7. The spatial computing headset of claim 1, wherein a central portion of the band-like enclosure is exposed as the system moves from the retracted configuration to the expanded configuration.

8. The spatial computing headset of claim 1, wherein the band-like enclosure is configured to withdraw from the sheath assemblies and simultaneously compress each of the elongated compression springs as the system moves from the retracted configuration to the expanded configuration.

9. The spatial computing headset of claim 1, wherein a braking device is provided between at least one of the sheath assemblies and the band-like enclosure of the inner band assembly to resist movement of the band-like enclosure relative to the sheath assemblies.

10. The spatial computing headset of claim 1, wherein a user-manipulable lock device is provided between at least one of the sheath assemblies and the band-like enclosure of the inner band assembly to prevent movement of the band-like enclosure relative to the sheath assemblies.

11. The spatial computing headset of claim 1, wherein each sheath assembly comprises a flexible band-like form factor.

12. The spatial computing headset of claim 11, wherein each sheath assembly includes a cage structure comprising a plurality of cage elements, wherein the cage structure at least partially surrounds a respective end of the band-like enclosure of the inner band assembly when the system is in the retracted configuration.

13. The spatial computing headset of claim 11, wherein, for each sheath assembly, the plurality of cage elements are spaced apart along a length of the sheath assembly to enable the sheath assembly to flex and assume a different curvature profile.

14. The spatial computing headset of claim 11, wherein each sheath assembly includes an internal guiding structure, and wherein the internal guiding structure and the plurality of cage elements define a band receiving passageway, wherein the band receiving passageway is configured to house the band-like enclosure of the inner band assembly.

15. The spatial computing headset of claim 14, wherein each sheath assembly includes an inner pad for engaging the user's body and an outer cover, and wherein the inner pad and the outer cover define an enclosure for housing the internal guiding structure and the plurality of cage elements.

16. The spatial computing headset of claim 1, wherein the sheath assemblies and the inner band assembly define a flexible and extendable band-like structure that is conformable to a profile of the user's body.

* * * * *